July 28, 1925.
A. F. FIFIELD
1,547,867
TIGHTENING ROD FOR SAW FRAMES
Filed Feb. 25, 1924
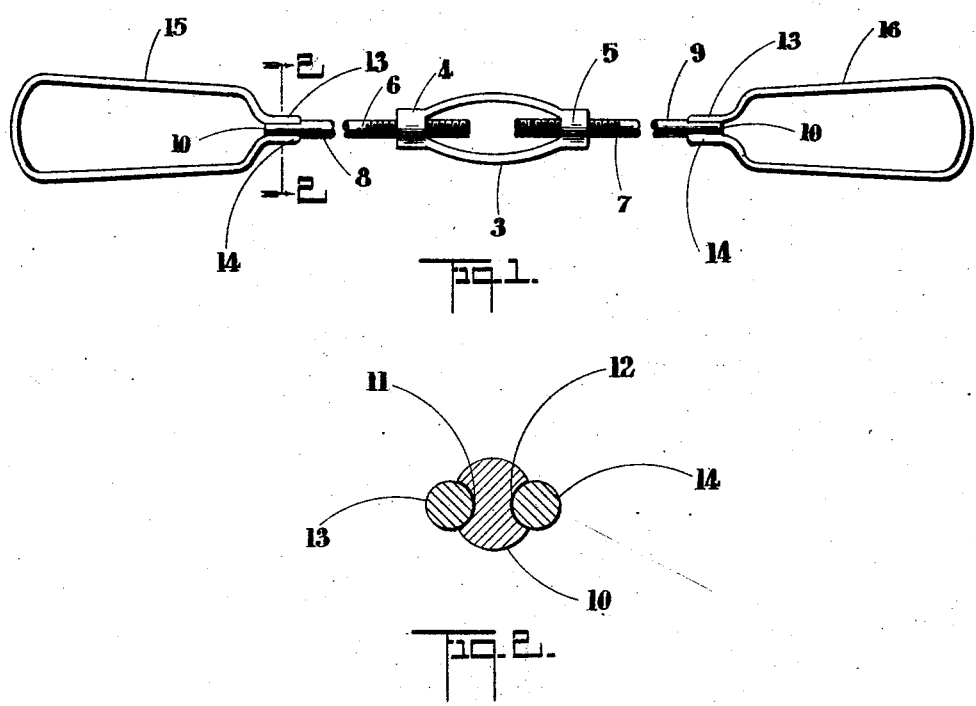
Inventor
A. F. Fifield
By Featherstonhaugh
Attorney Patented July 28, 1925.

1,547,867

UNITED STATES PATENT OFFICE.

ALBERT FRANK FIFIELD, OF ST. CATHARINES, ONTARIO, CANADA, ASSIGNOR TO T. F. SHURLY CO., LIMITED, OF ST. CATHARINES, ONTARIO, CANADA.

TIGHTENING ROD FOR SAW FRAMES.

Application filed February 25, 1924. Serial No. 695,065.

*To all whom it may concern:*

Be it known that I, ALBERT FRANK FIFIELD, a citizen of the Dominion of Canada, residing at 157 Ontario Street, in the city of St. Catharines, in the county of Lincoln, in the Province of Ontario and Dominion of Canada, have invented a new and useful Tightening Rod for Saw Frames, of which the following is a specification.

This invention appertains generally to the art of saws and has particular reference to tightening rods for bucksaw frames, as described in the present specification and illustrated by the accompanying drawings which form part of the same.

The invention consists essentially of the novel features pointed out broadly and specifically in the claims for novelty following a description containing an explanation in detail of an acceptable form of the invention.

Heretofore, a number of tightening rods for bucksaw-frames have been devised. Malleable cast iron tightening rods with integral frame-engaging loops have been extensively used with a considerable degree of efficiency, but are objectionable from the viewpoint of the manufacture, incidental to the high cost of production.

The five-piece tightening rod has developed of late, the same constituting a turnbuckle and threaded draw-bolts having upset ends which engage end-plates carried by frame-engaging loops. While tightening rods of this type may be manufactured on a more economical basis than the construction referred to, and have proven very serviceable generally, several operations are required to manufacture the same on a large scale, and incidentally considerable very expensive machinery is essential.

With the foregoing in view, among the aims and objects of my invention, may be cited the provision of a tightening rod for saw-frames including a turnbuckle, and draw-bolts to which frame-engaging loops are electrically welded, the ends of said draw-bolts being first pressed to form channels for reception of the aligned ends of the wire forming the frame-engaging loops.

In the drawings,—

Figure 1 is a fragmentary plan view of a tightening rod constructed in accordance with an acceptable form of my invention, and Figure 2 is an enlarged transverse section as it would appear when taken on the plane designated by the line 2—2 on Fig. 1.

The numeral 3 designates a turnbuckle which is preferably cast, the extremities 4 and 5 thereof being longitudinally drilled and tapped to receive the threaded ends 6 and 7 of the draw-bolts 8 and 9. The ends 10 of said draw-bolts are pressed to form longitudinal channels 11 and 12 for reception of the aligned extremities 13 and 14 of the frame-engaging loops 15 and 16.

By utilizing the channels 11 and 12, the frame-engaging loops may be firmly retained in position, which greatly facilitates the welding operation. By welding the terminals 13 and 14 of the frame-engaging loops to the ends 10 of the draw-bolts, a very rigid structure is provided which is not susceptible to deformation or breakage.

The foregoing construction provides a tightening rod for saw-frames which may be produced at a very moderate cost and yet one which is very substantial and easily adjusted.

I appreciate that turnbuckles, draw-bolts and frame-engaging loops have been used for a considerable period of time in the structure of tightening rods as hereinbefore referred to.

These I do not individually claim, but what I do claim and wish to secure by Letters Patent of the United States is:

A tightening rod for saw frames comprising a turnbuckle and rods extending therefrom, said rods having towards the ends thereof diametrically opposite grooves and loops having projecting pin ends fitted into said grooves and welded therein to said rods.

ALBERT FRANK FIFIELD.